UNITED STATES PATENT OFFICE.

JOHN F. MASCHER, OF PHILADELPHIA, PENNSYLVANIA.

PROCESS FOR ORNAMENTING DAGUERREOTYPE-CASES, &c.

Specification forming part of Letters Patent No. 16,600, dated February 10, 1857.

*To all whom it may concern:*

Be it known that I, JOHN F. MASCHER, of the city and county of Philadelphia, and State of Pennsylvania, have invented a new and useful Process of Ornamenting Daguerreotype or other Cases, Picture-Frames, Furniture, and other Articles in Imitation of Tortoise-Shell, Wood, Marble, and other Substances; and I do hereby declare that the following is a full, clear, and exact description of the same.

My invention consists in covering the surface of the article to be ornamented with paper stained or colored to imitate any desirable substance, or staining the said surface to produce the same effect, and afterward coating the surface thus prepared with gelatine and bichromate of potash, as hereinafter described. By this process I produce an ornamental surface that is proof against the action of water at any temperature and all ordinary influences to which articles of furniture or ornament are ordinarily subjected.

In carrying out my invention the most convenient method of giving the desired color or colors and proper grain or tints to the surface to be ornamented will generally be to cover it with paper stained in a suitable manner. The paper that is used by book-binders or that used by house-decorators may be obtained in as great variety as may be desired, and either is well suited for the purpose. This is caused to adhere to the surface by pasting or gluing or by the application of any other suitable adhesive material. When more convenient to do so, the surface itself may be stained, grained, or otherwise tinted or colored in a suitable manner. The surface thus prepared may be treated with gelatine and the bichromate of potash by two different methods. One of these methods is to dissolve the gelatine in a menstruum composed of a solution of bichromate of potash in water, and apply this compound solution to the stained, grained, colored, or otherwise-prepared surface in the same manner as any ordinary varnish; and the other method is to apply to the surface a simple solution of gelatine in the water, and when that has dried to place the article in a bath of a solution of bichromate of potash. The former of these methods, however, will be the most convenient for general purposes.

To prepare the compound solution of gelatine and bichromate of potash, I take of water, bichromate of potash, and gelatine (fine transparent glue) in about the following proportions, viz: water, one fluid ounce; bichromate of potash, six grains; gelatine, fifty grains. I dissolve the bichromate of potash in water and afterward add the gelatine or glue, and boil until the latter has thoroughly dissolved. While this compound solution is still hot I apply it all over the surface that has been prepared as before described with a brush. After the first coating has been allowed to dry, another coating may be given in the same manner, and this may be repeated several times, taking care that each coating is dry before another is applied. The smoothness of the surface will be much improved by exposing it after each coating of the solution has been applied to the action of a jet of steam or a steam bath, which will remove air-bubbles and undulations. The surface, after drying, is exposed to the direct rays of the sun for a few minutes, or to the action of diffused light for five or six hours, after which it will be found to have a darker appearance than before. It has now lost its sticky property, and cannot be dissolved by boiling water, and is in a fit state to be polished by friction. In polishing I generally use, first, pumice-stone powder or emery slightly moistened with oil, and finish with powdered rotten-stone, also slightly moistened with oil.

When the gelatine and bichromate of potash are used separately, I prepare a boiling-hot solution of gelatine (fine glue) of a degree of fluidity about the same as thin varnish and a solution of bichromate of potash of about the following strength, viz: water, one fluid ounce; bichromate of potash, six grains. After applying the glue solution over the surface with a brush and allowing it to dry, I place the article in a bath of the solution of bichromate of potash, and allow it to remain therein for four or five minutes. This may be repeated as often as may be necessary, according to the thickness of coating required, taking care to allow the glue to dry every time before submitting the surface to the action of the solution of bichromate of potash. The surface may be exposed to the action of steam after every coating of glue in the same manner as when the compound solution before described is used to produce a smooth surface. When the surface has been sufficiently coated in the above manner, it is exposed to the sun's rays or to the action of diffused light, and afterward polished, as before described.

What I claim as new, and desire to secure by Letters Patent, is—

The process of ornamenting daguerreotype-cases or other articles in imitation of tortoise-shell, wood, marble, and other substances by first covering the surfaces thereof with stained or colored paper of suitable character, or staining or coloring the surfaces themselves in a suitable manner, and afterward coating them with gelatine and bichromate of potash in any manner, substantially as herein specified.

JOHN F. MASCHER.

Witnesses:
JOHN G. WOLF,
WILLIAM H. AXE.